Patented Jan. 23, 1934

1,944,265

UNITED STATES PATENT OFFICE 1,944,265

FOOD PRODUCT

Bruno Pilorz, Honolulu, Territory of Hawaii, assignor to California Packing Corporation, San Francisco, Calif., a corporation of New York No Drawing. Application March 28, 1932
Serial No. 601,715

4 Claims. (Cl. 99—8)

This invention relates to a new and improved method of manufacturing a novel food product from waste products, and is specifically directed towards a process of making a product adapted for use as a stock and cattle food, chicken food, etc., from molasses or other impure sugar solutions and the corings, peelings and waste portions of pineapple.

Molasses and other impure sugar solutions contain numerous constituents having nutritive value such as, for example, mineral salts and carbohydrates, but heretofore it has not been possible to convert molasses into a product capable of being handled or used as a substantially dry food substance.

It is an object of this invention to disclose and provide a process whereby the alimentary and nutritive constituents of molasses may be utilized and rendered available as a stock or cattle food, the finished product being in the form of a meal.

In the canning of pineapple, there is about 50% waste consisting of material such as the stems, ends and outer more fibrous portions, as well as the cores which are also more fibrous than the body of the fruit. These peelings and waste contain constituents of nutritive value such as carbohydrates, mineral salts, proteins and fats. These nutritious ingredients have not been utilized heretofore in the preparation of a food. Instead, the waste has been discarded and the disposal of such waste has presented quite a problem to the canners of pineapples.

As has been stated hereinbefore, this invention is primarily directed toward a method of utilizing pineapple waste and molasses in the preparation of an alimentary product adapted for use as a cattle or chicken food.

It is an object of this invention to disclose and provide a method of producing a substantially dry, meal-like food product from pineapple waste and impure sugar solutions.

Another object of this invention is to disclose and provide a method of combining pineapple waste and impure sugar solutions in the production of a substantially dry stock food whereby the nutritious constituents of both the pineapple waste and the impure solution are retained in a readily available form.

A still further object of this invention is to disclose and provide a method whereby pineapple waste and molasses may be combined in a ready and efficacious manner for the production of a stock and cattle food therefrom.

These and other objects, uses and advantages of this invention will become apparent to those skilled in the art from the following detailed description of the process of this invention.

It has been found that a certain definite procedure should be followed in manufacturing the product to which this invention relates. For example, it has been found that corings and peelings of pineapple should be crushed and shredded to approximately the size that the final stock food is to have. The finished food product preferably is of such particle size that 70% to 85% thereof will pass a 3 mesh sieve. It is desirable, therefore, to crush and shred the pineapple waste so that substantially all of it will pass through a 3 mesh sieve. Furthermore, it has been found desirable that the shredded and pressed pineapple waste has a moisture content of more than 60% before being combined with the molasses. Preferably, the moisture content of the waste is between about 70% and 75%, but in all events, it should be above about 60%.

This wet and shredded pineapple waste is then sprayed or mixed with a desired quantity of molasses. The quantity of molasses added to the waste may vary from 20% to 45% by weight of the pineapple pulp. It has been found that by adding the molasses to the pulp, and particularly to a pulp containing more than 60% of moisture, a much more intimate distribution of the molasses throughout the pulp can be attained. The molasses is preferably heated before being added to the pulp.

Furthermore, it has been found that when the moisture content of the pulp is relatively high, that is, between about 70% and 75%, the salts and solids in solution in the molasses appear to penetrate the pineapple solids so that upon subsequent drying, efflorescence or incrustation of the pulp particles with crystallized salts, is prevented. After mixing the wet pulp with the molasses as described hereinbefore, the mixture is dried. Rotary dryers have been found to be eminently suited for this purpose. The temperature during drying and the rate of drying should be controlled so as to prevent or retard caramelization of the sugars. The temperatures employed during drying should not be sufficiently high, for example, to cause carbonization. The rate of drying, however, should be kept sufficiently high so as to prevent the formation of salt deposits or crystals on the surfaces of the particles of the pulp. Specific temperatures can not be stated as the treating operation is influenced by the size and type of drying equipment used, the velocity of the treating gases, and the quantity of material sent through the drying apparatus per unit of time. The temperature of the gases at the feed end of a rotary dryer must be high enough to prevent "balling" of the incoming wet waste materials. When rotary dryers are used, temperatures ranging from 250° F. to 325° F. as measured at discharge end, give good results.

It is to be noted that it is not necessary to let the mixture of wet pulp and molasses stand for any appreciable length of time before drying as the molasses appears to permeate and become a homogeneous and integral part of the product very quickly, provided the molasses is added to a pineapple pulp containing more than about 60% of moisture.

The mixture of molasses and pineapple waste is preferably dried to a final moisture content of between about 5% and 15% and preferably between 8% and 12%. In other words, the pineapple pulp is dried in the presence of the molasses, making a homogeneous product with the molasses becoming an integral part of the final bran or meal.

When the process is carried out in the manner described hereinbefore, it is not necessary to shred or disintegrate the dried product. The finer particles of pulp appear to aggregate and adhere to the larger particles during drying, thereby giving rise to a fairly granular product free from undesirable quantities of dust. A screen analysis of a typical product made in accordance with this invention should show that 70% to 85% of the product will pass through a 3 mesh sieve, less than 2% of the product passing through a 16 mesh sieve. Most of the product is retained on a 10 or 12 mesh sieve.

A product made in accordance with this invention will be found to contain from about 45% to 55% of carbohydrate, from 2% to 3% of proteins, and from about 0.25% to 0.5% of fats. Because of its physical characteristics, it is readily bagged and shipped and is commercially suited for use as a cattle, stock or chicken food.

Although a specific mode of operation has been described in detail, it is to be understood that numerous changes and modifications can be made in the process without departing from the spirit of the invention.

All such changes and modifications as come within the scope of the appended claims are embraced thereby.

I claim:
1. A process of making a food product, which comprises shredding the cores and outer cuttings from pineapples so as to form a shredded pineapple waste, mixing the shredded pineapple waste with an impure sugar solution while the moisture content of said pineapple waste is above about 60%, and then drying the mixture of pineapple waste and sugar solution to reduce the moisture content of the mixture to between about 5% and 15%.

2. In a process of making a cattle food, the steps of mixing shredded pineapple waste having a moisture content of above about 60% with 20% to 50% by weight of molasses, and then drying the pineapple waste while in contact with said molasses to reduce the moisture content of the mixture to between about 5% and 15%.

3. A process of making a cattle food, comprising shredding and disintegrating the cores and outer cuttings from pineapple to approximately 3 mesh and finer, adding molasses to said shredded pineapple waste, and then drying the mixture of pineapple waste and molasses to reduce the moisture content of the mixture to between about 5% and 15%.

4. In a process of making a cattle food, the steps of adding molasses to pineapple waste containing 70% to 75% of water, and then drying the mixture to reduce the moisture content thereof to between 5% and 15%.

BRUNO PILORZ.